United States Patent
Schreiber

(10) Patent No.: US 9,291,167 B2
(45) Date of Patent: Mar. 22, 2016

(54) HERMETIC MOTOR COOLING AND CONTROL

(71) Applicant: JOHNSON CONTROLS TECHNOLOGY COMPANY, Holland, MI (US)

(72) Inventor: Jeb W. Schreiber, Emigsville, PA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/369,015

(22) PCT Filed: Feb. 4, 2013

(86) PCT No.: PCT/US2013/024563
§ 371 (c)(1),
(2) Date: Jun. 26, 2014

(87) PCT Pub. No.: WO2013/119483
PCT Pub. Date: Aug. 15, 2013

(65) Prior Publication Data
US 2014/0363311 A1     Dec. 11, 2014

Related U.S. Application Data

(60) Provisional application No. 61/595,741, filed on Feb. 7, 2012.

(51) Int. Cl.
| | |
|---|---|
| *F04D 25/06* | (2006.01) |
| *F04D 29/08* | (2006.01) |
| *F04D 29/58* | (2006.01) |
| *F25B 31/00* | (2006.01) |
| *F04D 29/058* | (2006.01) |

(52) U.S. Cl.
CPC ............ *F04D 25/06* (2013.01); *F04D 25/0606* (2013.01); *F04D 29/058* (2013.01); *F04D 29/5806* (2013.01); *F25B 31/006* (2013.01); *F25B 31/008* (2013.01)

(58) Field of Classification Search
CPC ............ F04D 29/5806; F04D 29/5886; F25B 31/006; F25B 31/008
USPC ............ 62/505, 199, 211; 417/366, 369, 370; 310/54
See application file for complete search history.

(56) References Cited

U.S. PATENT DOCUMENTS

| | | | | |
|---|---|---|---|---|
| 3,188,833 A | * | 6/1965 | Robinson | 62/505 |
| 3,218,825 A | * | 11/1965 | McClure | 62/505 |
| 3,241,331 A | * | 3/1966 | Endress et al. | 62/117 |
| 3,388,559 A | * | 6/1968 | Johnson | 62/224 |
| 3,645,112 A | * | 2/1972 | Mount et al. | 62/505 |

(Continued)

*Primary Examiner* — Alexander Comley
(74) *Attorney, Agent, or Firm* — McNees Wallace & Nurick LLC

(57) ABSTRACT

An apparatus and method for cooling a compressor motor (152) having a motor stator (162) and rotor (166) in a refrigerant system (100). The method cools the rotor and the stator, electromagnetic bearings (160) located within a compressor housing providing refrigerant liquid to the stator internal channels, the channels being in fluid communication with a rotor passageway (172), and a flow-control device (168) controlling refrigerant flow into the stator. A temperature monitoring device (176) in communication with a controller (140) monitors motor temperature. The controller (140) evaluates the motor temperature and adjusts refrigerant flow through the flow control device (168), maintaining the motor (152) within a predetermined temperature range.

14 Claims, 5 Drawing Sheets

(56) References Cited

U.S. PATENT DOCUMENTS

| | | | |
|---|---|---|---|
| 3,805,101 A * | 4/1974 | Purman | 310/54 |
| 3,838,581 A * | 10/1974 | Endress | 62/468 |
| 3,866,438 A * | 2/1975 | Endress | 62/468 |
| 3,913,346 A * | 10/1975 | Moody et al. | 62/197 |
| 4,182,137 A * | 1/1980 | Erth | 62/505 |
| 4,878,355 A * | 11/1989 | Beckey et al. | 62/115 |
| 5,350,039 A * | 9/1994 | Voss et al. | 184/6.16 |
| 5,475,985 A * | 12/1995 | Heinrichs et al. | 62/117 |
| 5,857,348 A * | 1/1999 | Conry | 62/209 |
| 6,032,472 A * | 3/2000 | Heinrichs et al. | 62/199 |
| 6,065,297 A * | 5/2000 | Tischer et al. | 62/84 |
| 6,324,858 B1 * | 12/2001 | Holden | 62/211 |
| 6,450,781 B1 * | 9/2002 | Petrovich et al. | 417/350 |
| 7,451,616 B2 * | 11/2008 | Ro | 62/505 |
| 8,021,127 B2 | 9/2011 | De Larminat | |
| 8,156,757 B2 * | 4/2012 | Doty et al. | 62/505 |
| 8,397,534 B2 * | 3/2013 | Doty et al. | 62/505 |
| 2003/0094007 A1 * | 5/2003 | Choi et al. | 62/197 |
| 2007/0212232 A1 * | 9/2007 | De Larminat | 417/83 |
| 2008/0098768 A1 * | 5/2008 | Masoudipour et al. | 62/505 |
| 2008/0199326 A1 * | 8/2008 | Masoudipour et al. | 417/247 |
| 2009/0044548 A1 * | 2/2009 | Masoudipour et al. | 62/115 |
| 2009/0229280 A1 * | 9/2009 | Doty et al. | 62/115 |

* cited by examiner

HERMETIC MOTOR COOLING AND CONTROL

FIELD OF THE INVENTION

This present invention relates to systems and methods for improved cooling of motors used to drive compressors, such as air compressors and compressors used in refrigeration systems. In particular, the application relates to cooling of compressor motor stators using refrigerant liquid and compressor rotors by use of the same refrigerant after it has passed through the stator.

BACKGROUND OF THE INVENTION

During operation of a compressor in a refrigeration cycle, the compressor is driven by a shaft which is rotated by an electric motor. Simply stated, heat is generated by the motor as electrical current is passed through a series of windings forming a stator, in sequence, which then causes a rotor to rotate. The rotor and stator are contained within a motor housing. The rotor includes a shaft that may be connected to other equipment, which in this case is the compressor. In advanced compressors, the rotor may be supported by electromagnetic bearings. These bearings also may generate heat and the bearings may be considered to be part of the motor. Cooling must be provided to remove heat and prevent the motor from overheating, as motors are usually provided with automatic shut-down features if the temperature of the motor exceeds a predetermined limit in order to prevent damage to the motor.

Various schemes have been used to remove heat from the compressor motor in refrigerant applications. One such technique is described in U.S. Pat. No. 8,021,127 to De Larminat issued on Sep. 20, 2011, ("the '127 Patent") and assigned to the Assignee of the present invention. The '127 Patent draws refrigerant gas from the evaporator and routes the gas through the motor, the gas passing through the gap between the rotor and the stator. The refrigerant gas from the evaporator is significantly cooler than the temperature of the motor, so the refrigerant gas cools the region as the gas flows through the rotor. After the refrigerant passes through the rotor, it is cycled back to the compressor inlet or suction. Other techniques also pass refrigerant fluid through passageways in the stator. One of the problems with these arrangements is that, while the refrigerant is effective in cooling the motor, the motor can become so cool that condensation forms on the motor housing, undesirably causing water from the condensation to drip from the housing onto the floor.

What is needed is a design that provides cooling to the motor, but which can regulate the temperature of the motor so that the temperature does not fall below the dew point of the air in the location in which the compressor motor is located, thereby preventing condensation from forming on the motor housing and eliminating the problem with water forming on the floor below the compressor motor.

SUMMARY OF THE INVENTION

The present invention comprises apparatus and a method for cooling a stator and a rotor of a motor in a system utilizing a compressor such as a refrigerant system. The apparatus includes a stator having internal channels, a rotor positioned inside the stator and having a passageway between the rotor and the stator, a housing hermetically sealing the rotor and the stator, electromagnetic bearings located within the housing and positioned at an end of the rotor, a refrigerant line providing refrigerant liquid to the stator internal channels, the internal channels of the stator being in fluid communication with the rotor passageway, and a flow control device positioned to control the flow of refrigerant through the internal channels of the stator. The motor includes a first line to cycle any liquid refrigerant to the evaporator, and a second line to cycle refrigerant gas to the low pressure side of the refrigerant system. At least one temperature monitoring device is included with the motor. The temperature monitoring device is in communication with a controller. The temperature monitoring device determines the temperature of the motor and provides a signal indicative of the motor temperature to the controller. The controller evaluates the motor temperature and adjusts the flow of refrigerant through the flow control device to maintain the motor at a temperature within a range that is sufficiently high to prevent condensation from forming on the exterior of the motor housing. Of course, the controller would also maintain the flow of refrigerant through the flow control device to maintain the motor at a temperature below the set point of an automatic temperature cut off device that stops motor operation to prevent overheating.

The refrigerant system includes refrigerant, which may be present in the system as a gas or a liquid, a compressor to compress refrigerant gas to a high pressure, a condenser in fluid communication with the compressor that condenses the high pressure refrigerant gas to a high pressure liquid, a cooling tower to cool and control the condensing temperature, a subcooler in fluid communication with the condenser to further cool the refrigerant from the condenser, a line from the subcooler to the evaporator to provide fluid communication between the subcooler and the evaporator, wherein liquid refrigerant undergoes a phase change in the evaporator and wherein the evaporator is in fluid communication with the compressor. A variable orifice valve also is included in the system in the line between the subcooler ant the evaporator to reduce the pressure of refrigerant flowing from the subcooler to the evaporator. A liquid line from a conduit between the subcooler and the variable orifice valve provides subcooled refrigerant to the compressor motor. A liquid line from a liquid drain associated with the motor returns condensed refrigerant from the motor to the evaporator. A fluid line from the motor returns refrigerant in the gaseous state to the evaporator. A controller controls operation of the refrigerant system.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
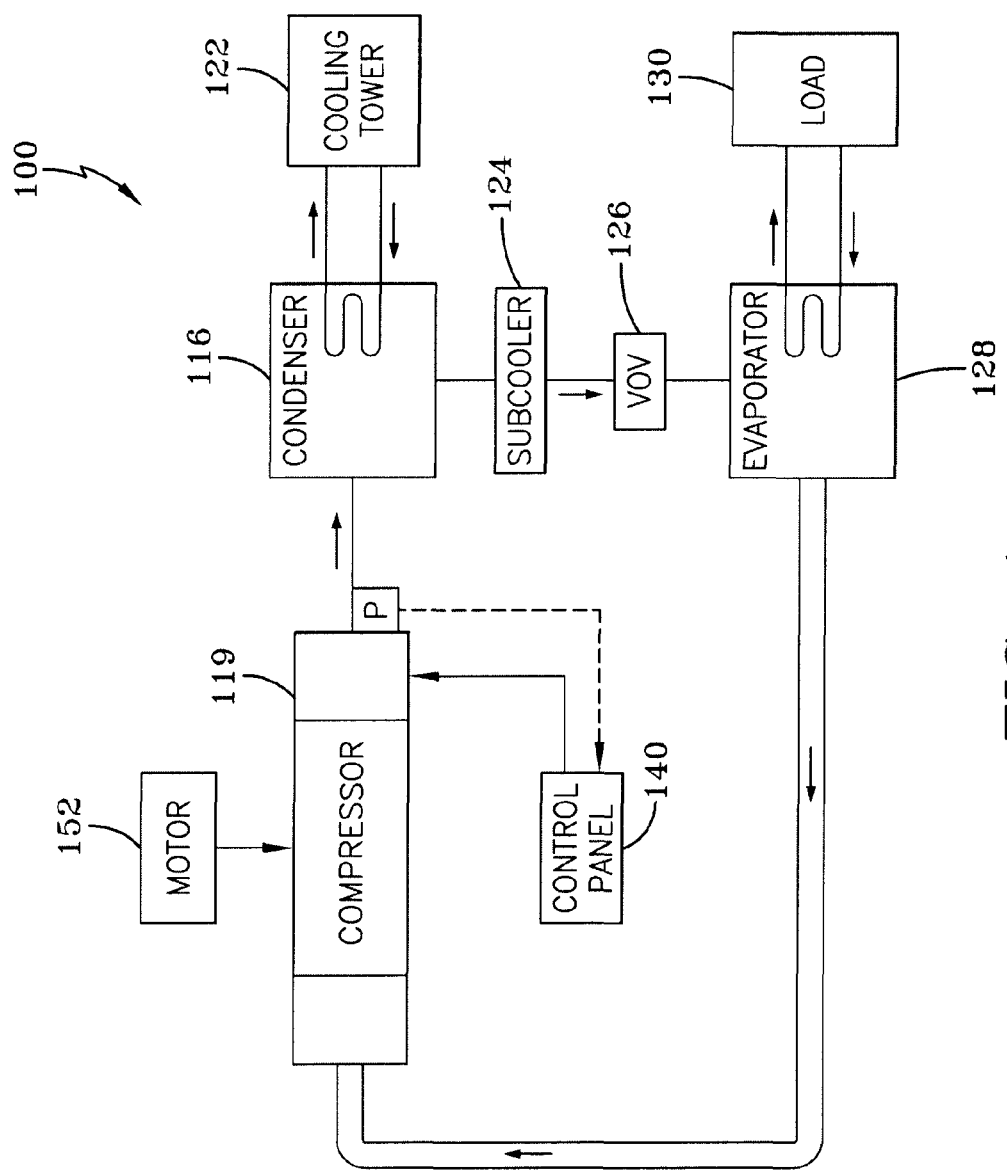
FIG. 1 is a schematic representation of a refrigerant system that includes a variable orifice valve and a subcooler located between the condenser and the variable orifice valve.

Referring to FIG. 1, which is a schematic representation of a refrigerant system 100 that includes a variable orifice valve 126 and a subcooler 124 located between condenser 116 and subcooler 124, compressor 119 is in fluid communication with a condenser 116, which receives high pressure refrigerant gas from compressor 119. Condenser 116 is a heat exchanger that condenses the high pressure gas into a high pressure liquid. Condenser 116 is in heat exchange communication with another media. The heat exchange media may be air. For systems requiring higher capacity, the heat exchange media is usually a liquid, such as water, which is cycled through a cooling tower 122. Condenser 116 is in fluid communication with an evaporator 128, where the refrigerant undergoes a change of state from liquid to a gas. Between condenser 116 and evaporator 128, there typically is an expansion device that expands the high pressure liquid to a liquid or a mixture of liquid and gas having lower pressure. In FIG. 1, this expansion device is a variable orifice valve (VOV) 126. In the system shown in FIG. 1, a subcooler 124 is situated between condenser 116 and VOV 126 to further cool the high pressure liquid from the condenser. Evaporator 128 is a heat exchanger, and air or water in heat exchange relationship with the evaporator coils is chilled as the liquid undergoes a change of state. When water is passed over the evaporator coils cooling the water, the apparatus in heat exchange relationship with the evaporator is referred to as a chiller 130, which stores the chilled water and cycles it to the building or other equipment for cooling purposes. Low pressure refrigerant gas from evaporator 128 is then cycled back to compressor 119 and the cycle is repeated.

System 100 also includes a control panel 140 that includes a controller to monitor conditions in the system and in the building or in the equipment that is to be cooled, and adjusts operation of system 100 to maintain temperatures in the building or in the equipment at preselected levels, while operating system 100 as smoothly and as efficiently as possible. Also shown in FIG. 1 is motor 152 that drives compressor 108, motor 152 being controlled by a controller, which is conveniently in control panel 140, but which may be located at any other location. Since it is clear that the controller can be located anywhere, but is shown as part of the control panel, controller 140 and control panel 140 will be used interchangeably herein. Motor 152 is in communication with controller 140 either electrically, electronically or by wireless communication.

Figure 2:
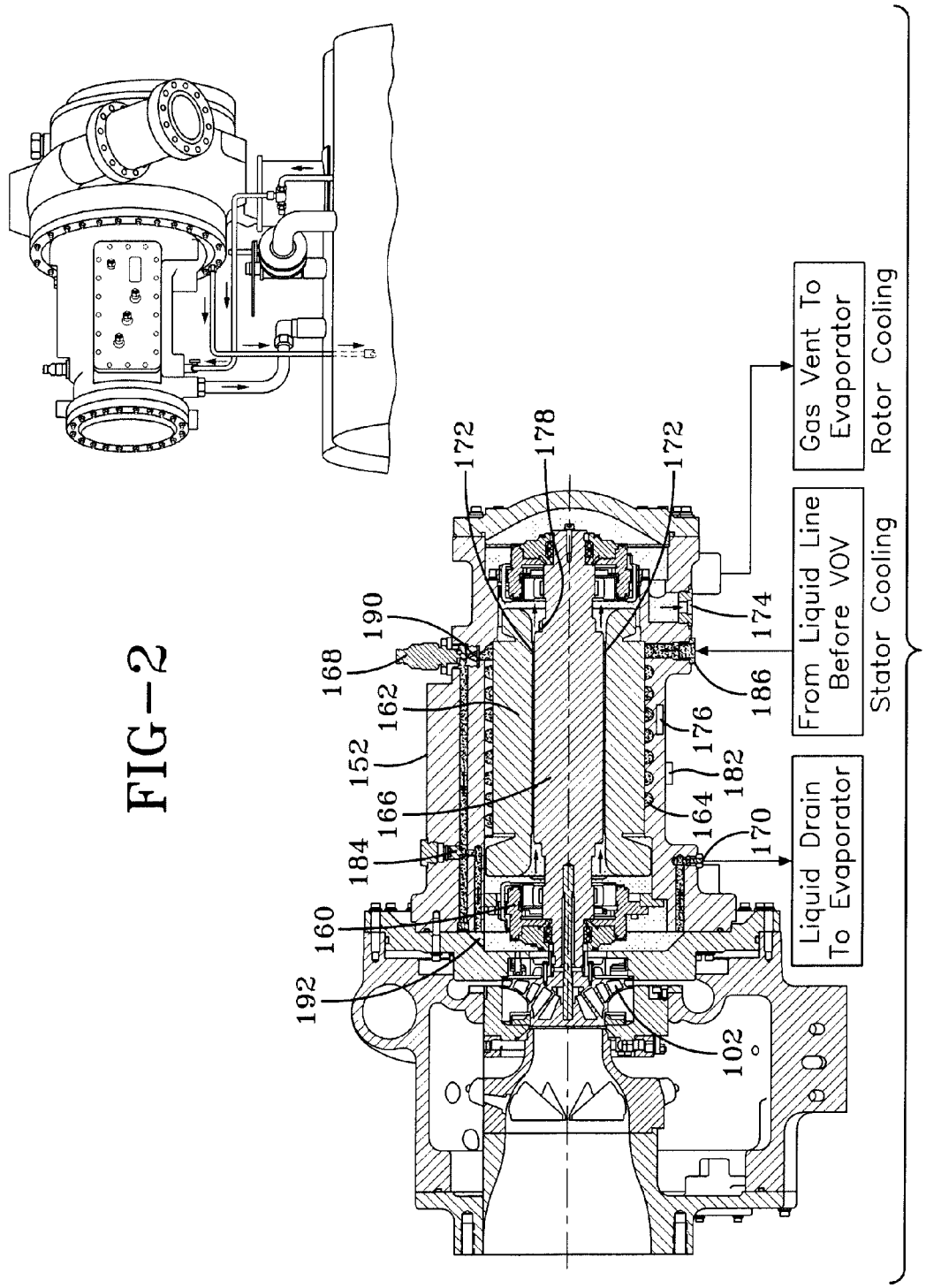
FIG. 2 is a schematic representation of the motor cooling circuit of the present invention for a compressor having electromagnetic bearings and inputting liquid refrigerant as a cooling medium.

FIG. 2 is a cross-sectional view of compressor 119 with attached motor 152, depicting the cooling scheme of the present invention. For comparison purposes, a cooling scheme different from the present invention is presented in FIG. 3, which also shows a cross-sectional view of an otherwise substantially identical compressor and motor.

Figure 3:
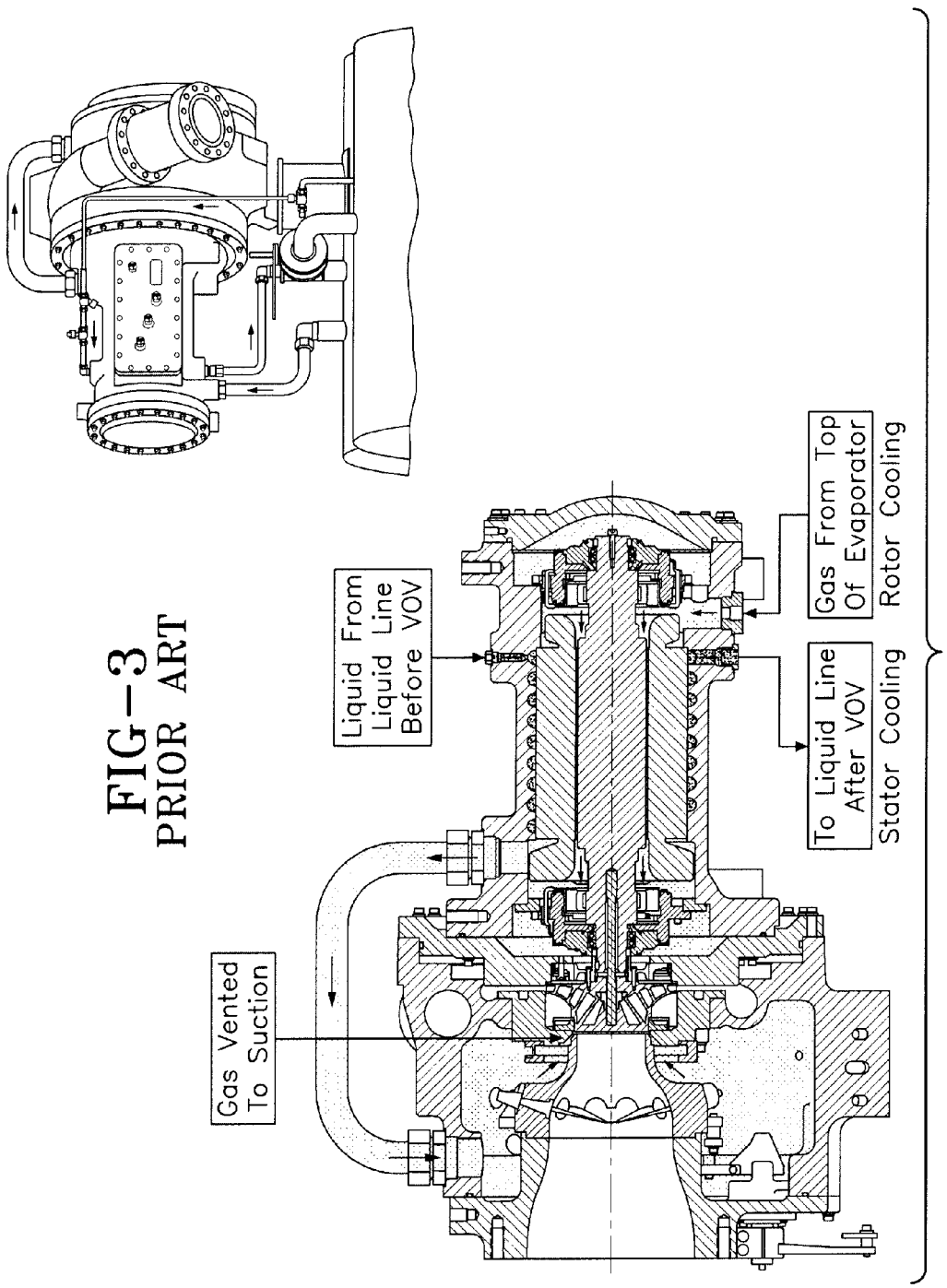
FIG. 3 is a schematic representation of a prior art motor cooling circuit for a compressor having electromagnetic bearings utilizing both liquid refrigerant and gas refrigerant as a cooling medium.

In FIG. 3, a prior art cooling scheme for the otherwise identical compressor and its motor is set forth. The motor is comprised of a stator that is connected to an electrical power source, and a rotor, which is positioned within the stator. The motor makes use of electromagnetic bearings to support and to center the rotor both axially and radially during operation of the system. The system uses back-up mechanical bearings in the event of a power failure. Application of electrical power to the stator causes the rotor to rotate, but also results in the generation of a significant amount of heat by the stator and the rotor. The electromagnetic bearings also generate additional heat. The rotor, connected to the impeller, in turn causes the impeller to rotate and refrigerant to be compressed.

Liquid refrigerant is provided to cool the stator, the liquid refrigerant being drawn from the conduit before the expansion device or VOV (i.e. high pressure side of system). A separate source of cooling fluid is provided to cool the rotor. This separate source of cooling fluid is gas drawn from the evaporator and sent through the passage way between the rotor and the stator, and into the suction end of the compressor. Liquid used to cool the stator is circulated through cooling channels provided in the stator to cool the stator, some of the liquid forming a gas. The mixed gas and liquid is then is returned to the refrigerant line on the low pressure side (evaporator side) of the VOV, between the VOV and the evaporator.

Refrigerant gas used to cool the rotor passes over, around and/or through electromagnetic bearings located at either end of the rotor, cooling the electromagnetic bearings, as well as through the gap between the stator and the rotor. Because electromagnetic bearings are used in the system, there is no need to provide lubrication to the motor, and there is no need to include in the system means for separating lubricant from the refrigerant. The refrigerant gas, after removing heat from the rotor region and the electromagnetic bearings, is returned to the system at the inlet to the compressor, on the low pressure side of the compressor impeller.

The system is very effective in cooling the motor. It is so effective that the motor housing can be cooled below the dew point of air in the equipment room or bay where the compressor is located. When this happens, condensation undesirably forms on the motor housing and drips onto the floor of the equipment room or bay. This not only makes it difficult to work in these areas, but becomes a health hazard for those who must frequent the area, the wet regions being a source of bacteria and mold growth. In addition, electronic components, such as sensors, may be damaged by water collecting in the plug terminals, and water may result in a shock risk in the presence of high voltages.

The present invention, depicted in FIGS. 1 and 2, overcomes the problems with over-cooling and condensation formation. While the current system 100 also uses a VOV 126 as an expansion device, it also includes a subcooler 124 to further cool refrigerant below the temperature of refrigerant in the condenser. Motor 152 is connected to impeller 102. When stator 162 is powered from an electrical source (not shown), rotor 166 connected to impeller 102, imparts rotational motion to impeller 102. However, significant heat is generated in motor 152 when stator 162 is powered.

Liquid refrigerant for cooling the motor is provided to the motor from subcooler 124 or from any other location in system 100 between subcooler 124 and VOV 126. This liquid refrigerant is provided to stator 162 for cooling, passing through cooling channels 164 in or adjacent to stator 162. Some of this liquid refrigerant may be converted to a gas. The liquid/gas mixture leaving stator 162 is then directed to rotor 166. An expansion valve 168 is located in the refrigerant line at some point between subcooler 124 and prior to the entrance of refrigerant into rotor 166. Preferably the expansion valve is an electronic expansion valve (EEV) 168 positioned between an exit from stator cooling channels 164 and entrance into rotor, as shown in FIG. 2. EEV 168 is also in communication with controller 140. EEV 168 regulates the flow of refrigerant passing through cooling channels 164 into rotor 166.

A portion of the liquid and mist, which may further condense into liquid droplets, flows by gravity to liquid drain 170 which is in fluid communication with evaporator 128, liquid flowing from drain 170 to evaporator 128. A refrigerant mist, which as used herein, is a mixture of refrigerant gas and refrigerant droplets, is circulated past electromagnetic bearings 160 and into rotor 166, passing along rotor gap 172. As the refrigerant mist flows over electromagnetic bearings 152 and along rotor gap 172, the mist removes heat from bearings 152 as well as from both rotor 166 and stator 162. The refrigerant droplets undergo a change of state from liquid to gas as they progress through rotor 166 while absorbing heat. Because electromagnetic bearings 160 are used in the system, there is no need to provide lubrication to motor 152, so that there is no need to include in the system means for separating lubrication from the refrigerant. On passing through rotor 166, refrigerant gas passes through gas vent 174 which is in fluid communication with evaporator 128, the gas being transferred to evaporator 128.

Still referring to FIG. 2, System 100 further includes temperature monitoring devices for controlling the temperature of the motor by regulating the flow of refrigerant through the motor. While any temperature monitoring device may be used, thermistors are the temperature monitoring device of choice. A stator thermistor 176 is positioned at a location within the stator to monitor the temperature of the stator. More than one stator thermistor 176 may be positioned at various locations in stator 162 to monitor the temperature at various locations within stator 162. A rotor thermistor 178 is positioned at a location along rotor 166 or adjacent to rotor gap 172 to monitor the temperature of rotor 166. More than one rotor thermistor 178 may be positioned at various locations along rotor 166 or rotor gap 172 to monitor the temperature of rotor 166 at various locations. An optional motor housing thermistor 182 may be positioned on the motor housing. Motor housing thermistor 182 is optional because temperature measurements from stator thermistor 176 and rotor thermistor 178 will allow the system to respond quickly to changes in condition as will be explained. All thermistors 176, 178 and 182 are in communication with controller 140, continually reporting sensed temperatures to the controller for evaluation. The temperature of the entering condensing cooling water, cooling water returned from the cooling tower, is also monitored by a temperature monitoring device, which is also in communication with controller 140.

In operation, refrigerant flowing through stator cooling channels 164 and rotor gap 172 remove heat from stator 162, rotor 166 and electromagnetic bearings 160. The temperature within stator 162 and rotor 166 is monitored. As long as the monitored temperatures are maintained between a predetermined minimum value and a predetermined maximum value, the flow rate of refrigerant may remain unaltered. The predetermined minimum value is a temperature at which the motor housing will not be below the dew point of air surrounding motor 152. The predetermined maximum value is a temperature at which the motor housing will not rise above a temperature at which the compressor can overheat, including an additional margin. A compressor usually includes a safety device, such as a circuit breaker or other current cut off switch, which causes the unit to shut down if a monitored temperature is reached or exceeded. The additional margin may be a predetermined value such as 5° F. or 10° F., the margin being decided by the size of the compressor, the application, the environment and other factors.

When a predetermined minimum temperature of one or more thermistor 176, 178 is reached, the monitored temperature being reported to controller 140, the motor is being provided with too much refrigerant, which is cooling at a rate which could cause condensation to form on the motor housing. In response to this sensed condition, controller 140 provides a signal to preferred EEV 168 to throttle back the flow of refrigerant through motor 152 until the temperatures begin to rise above the predetermined minimum value. It should be noted that the predetermined minimum value may be set at the entering condensing cooling water temperature plus a margin. The entering condensing cooling water temperature may be selected because the dew point of ambient air cannot be higher than the entering condensing cooling water temperature. Furthermore, the entering condensing cooling water temperature is also monitored and communicated to controller 140.

When a predetermined maximum value temperature of one or more thermistors 176, 178 is reached, the monitored temperature being reported to controller 140, motor 152 is being provided with too little refrigerant, which indicates that motor 152 is heating at a rate which could cause shut down of the compressor. In response to this sensed condition, controller 140 provides a signal to EEV to increase the flow of refrigerant through motor 152 until the monitored temperature begins to fall below the predetermined maximum value.

FIG. 2 also depicts service valve 184. While service valve 184 is useful, it does not affect the protection scheme of the present invention. Service valve 184 is used in conjunction with a second service valve (not shown) on the upstream side of cooling refrigerant inlet 186. These service valves can be used to isolate EEV 168 for service, maintenance or replacement.

FIG. 4 is a graphical representation of the differences in cooling between the cooling scheme of the present invention, depicted in FIG. 2 and the prior art cooling scheme depicted in FIG. 3. In FIG. 4, the graphs represent refrigerant pressure (ordinate) vs. enthalpy (abscissa) for the respective cooling schemes. In both graphs, the vertical lines to the left of the curve represent liquid refrigerant. The area under the curve represents a mixture of gas and liquid refrigerant. Substantially vertical lines to the right of each curve represent refrigerant gas.

Figure 4A:
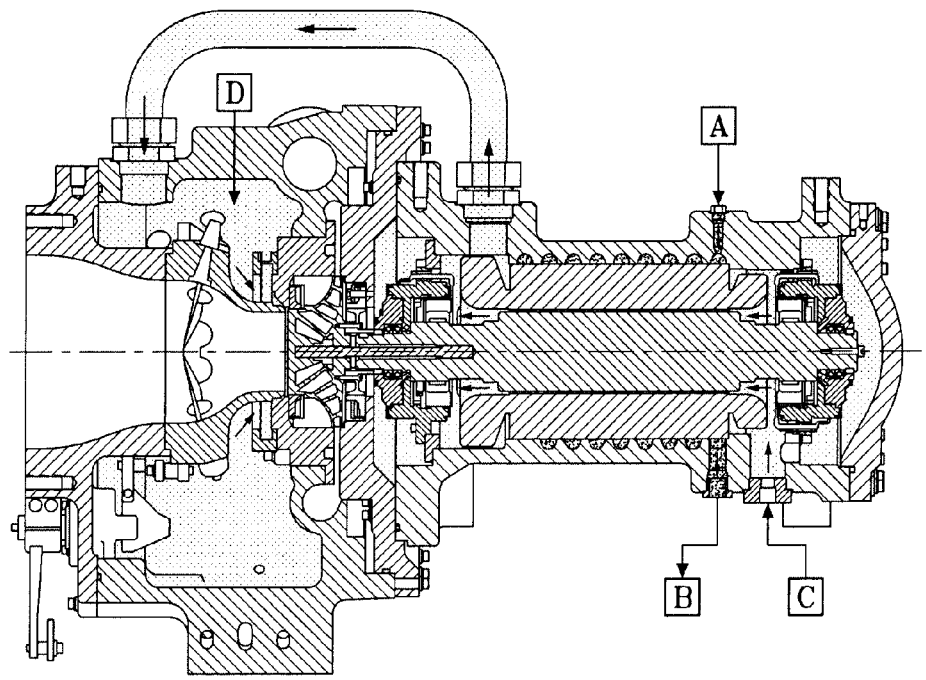
FIG. 4 is a graph representing gas pressure (ordinate) vs. enthalpy (abscissa) for the cooling schemes represented in FIGS. 2 and 3, wherein the graph of FIG. 4A represents the cooling scheme represented in FIG. 3 and the graph of FIG. 4B represents the cooling scheme represented in FIG. 2.
Figure 4A:
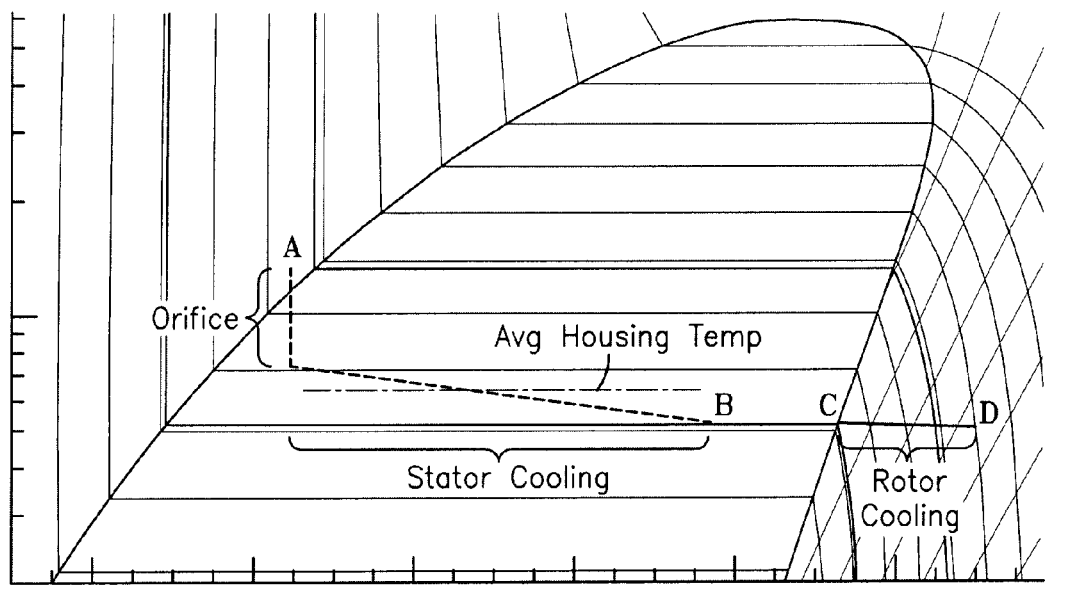

Referring to FIG. 4A, which represents the prior art cooling scheme, liquid refrigerant on entering the compressor at stator inlet A (orifice) undergoes a large pressure drop and cools the stator before exiting the stator at stator outlet B. This large pressure drop flashes some of the liquid refrigerant to gas, and heat is absorbed from the stator as a result of the change of state. After cycling through the stator, the refrigerant exits the stator at stator outlet B as a liquid/gas (mist) mixture. Gas is provided at rotor inlet C and passes through the rotor exiting from the motor at compressor inlet D. Of course, this is represented outside the curve as gas by line C-D. Because of the large cooling capacity provided by the pressure drop as liquid refrigerant flashes to refrigerant gas, the average housing temperature may be lowered below the dew point resulting in condensation.

Figure 4B:
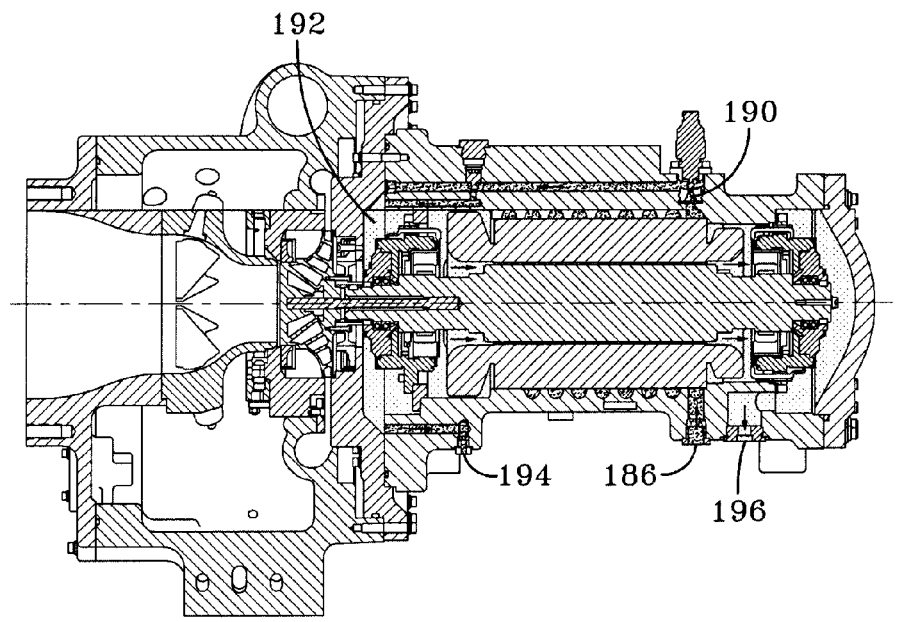
Figure 4B:
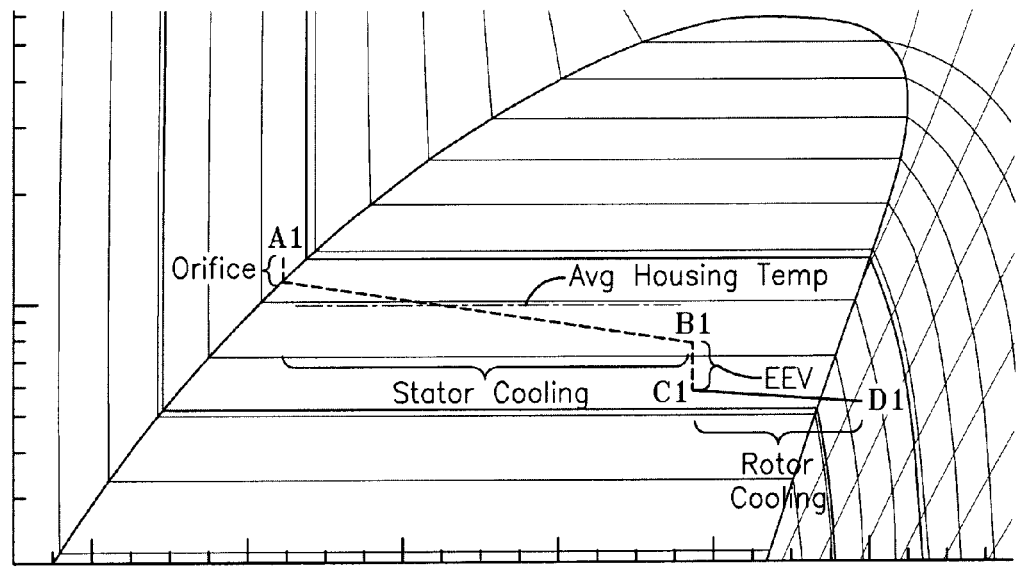

Referring to FIG. 4B, which represents the cooling scheme of the present invention, liquid refrigerant enters stator 162 at cooling refrigerant inlet (orifice) 186 (A1) and passes through stator cooling channels 164. As can be seen by the graph, the entering liquid refrigerant undergoes only a minor pressure drop, so that the amount of liquid flashing to gas as a result of the pressure drop is minimized, although some additional conversion of liquid to gas occurs as refrigerant absorbs heat from stator 162. This transfer of heat is represented on the graph by line A1-B1. B1 represents the position of electronic expansion valve 168 in FIG. 2, which is also immediately adjacent stator outlet 190 of refrigerant from stator cooling channels 164. EEV 168 is controlled by controller 140 in response to temperatures from stator thermistor 176 and rotor thermistor 178, so the amount of refrigerant flowing through both stator cooling channels 164 and into rotor 166 can be controlled. As refrigerant passes through EEV 168 (adjacent to stator outlet 190), it undergoes an additional pressure drop and the fluid moves to rotor inlet 192, the movement of refrigerant through EEV 168 to rotor inlet 192 being represented by the line B1-C1 in FIG. 4B. Note that the pressure drop at EEV 168 (immediately adjacent to stator outlet 190) is sufficient to convert some liquid to gas, but that line B1-C1 remains under the curve. At rotor inlet 192, some of the excess liquid refrigerant exits the motor at rotor liquid drain 170, which is in fluid communication with evaporator 128. The remainder of the refrigerant enters the motor, passing through gap 172 between stator 162 and rotor 166, cooling the rotor. Heat is absorbed as refrigerant traverses gap 172 and exits the motor at motor gas vent 174, 196 in FIG. 4B, which also is in fluid communication with evaporator 128. This is represented in FIG. 4B by line C1-D1. As can be seen in FIG. 4B, as liquid droplets in the mist are converted to gas as they pass through rotor gap 172 and the electromagnetic bearing before it reaches motor gas vent 174, line C1-D1 moves from under the enthalpy curve to the vertical gas line region to the right of the curve. As can be seen, refrigerant passing through EEV 168 experiences pressure drops, and the amount of refrigerant flowing through motor 152 can be controlled by controlling flow through EEV 168, so that the average housing temperature can be controlled above the dew point.

The present invention provides a motor cooling system that can monitor the temperature of motor 152 and maintain motor 152 within predetermined temperature limits, which at the low end of the limits, prevent condensation from forming on the motor housing cover, and, which at the high end of the limits, prevents motor 152 from overheating. The system utilizes controller 140, which monitors sensors 140 reporting temperatures within the motor. Controller 140 then sends signals to EEV 168 to increase or decrease the flow of refrigerant to the system when the sensed temperatures fall outside of predetermined temperature limits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A compressor assembly comprising: a compressor housing; a compressor positioned within the housing; a compressor inlet, to input refrigerant gas to the compressor; a motor, the motor comprising a motor housing, a stator positioned within the motor housing, the stator having windings and cooling channels, a rotor positioned within the stator, the rotor having a shaft having a first end connected to an impeller the compressor and a second end, a rotor gap located between the stator and the rotor, wherein when electrical current is applied to the stator windings, the rotor rotates, causing the compressor to operate; electromagnetic bearings positioned at both ends of the rotor to support the rotor when current is applied to the stator windings; the motor further including a temperature monitoring device positioned within the stator; a stator inlet and a stator outlet, the stator inlet receiving liquid refrigerant for cooling the stator, a rotor inlet, a rotor liquid drain and a rotor gas vent, the rotor inlet receiving refrigerant from the stator outlet and sending it through the rotor gap; a flow control device positioned within the stator to control the flow of refrigerant in response to the temperature of the stator and the rotor as provided by the temperature monitoring device; and wherein the stator outlet provides refrigerant to the rotor inlet via a flow passage formed entirely within the motor housing.

2. The compressor assembly of claim 1 wherein the compressor is a centrifugal compressor having an impeller connected to the rotor shaft and positioned within the compressor housing.

3. The compressor assembly of claim 1 wherein the temperature monitoring device is a thermistor.

4. The compressor assembly of claim 1 wherein the liquid refrigerant to cool the motor is provided from a subcooler.

5. The compressor assembly of claim 1 further including a controller to regulate the flow of liquid refrigerant through the flow control device in response to the temperature of the stator as provided by the temperature monitoring device positioned within the stator.

6. The compressor assembly of claim 5 further including a rotor temperature monitoring device positioned within the rotor to provide the rotor temperature to the controller to regulate the flow of liquid refrigerant through the flow control device in response to the temperature of the stator and the rotor.

7. The compressor assembly of claim 6 wherein the rotor temperature monitoring device is positioned adjacent a rotor gap.

8. The compressor assembly of claim 6 wherein the rotor temperature monitoring device is a thermistor.

9. The compressor assembly of claim 1 wherein the flow control device is an expansion valve.

10. A method for cooling a compressor motor in a refrigeration system comprising the steps of:
    providing a compressor motor having a stator and a rotor hermetically sealed within a motor housing, a rotor gap located between the stator and the rotor, the rotor having a shaft, and the compressor motor in fluid communication with a source of high pressure subcooled, refrigerant liquid;
    providing a flow of high pressure refrigerant liquid to the stator;
    monitoring the temperature of the stator;
    circulating the refrigerant liquid through the stator to remove heat from the stator to maintain the temperature of the stator within a predetermined range;
    lowering the pressure of the high pressure refrigerant exiting the stator from a stator outlet prior to providing the refrigerant to an inlet of the rotor;
    providing the refrigerant from the stator outlet to the rotor inlet after lowering the pressure of the refrigerant;
    circulating the refrigerant through the rotor inlet and through the rotor gap to remove heat from the rotor;
    adjusting a flow of refrigerant to the stator to maintain the temperature of the stator within the predetermined range;
    returning liquid refrigerant exiting the stator and not entering the rotor to an evaporator;
    returning refrigerant exiting the rotor to the evaporator; and
    wherein the stator outlet provides refrigerant to the rotor inlet via a flow passage formed entirely within the motor housing.

11. The method of claim 10 further including the steps of monitoring the temperature of the rotor; and
    circulating the refrigerant through the rotor to remove heat from the rotor to maintain the temperature of the rotor within a predetermined range.

12. The method of claim 10 wherein the step of circulating the refrigerant through the stator to maintain the temperature of the stator within the predetermined range includes maintaining the temperature of the stator between a preselected maximum temperature, the preselected maximum being a temperature below a safety device activation temperature, and a preselected minimum temperature, the preselected minimum temperature being a temperature at which the motor housing will not be below a dew point of air surrounding the motor.

13. The method of claim 12 further including the steps of
providing a controller;
providing a flow control device in communication with the controller;
providing a stator temperature monitoring device in communication with the controller;
providing a rotor temperature monitoring device in communication with the controller; and
wherein the step of adjusting the flow of refrigerant to the stator further includes providing a signal from the stator temperature monitoring device to the controller indicative of the stator temperature, providing a signal from the rotor temperature monitoring device to the controller indicative of the rotor temperature, the controller determining whether the stator temperature is within a predetermined temperature range an whether the rotor temperature is within a predetermined temperature range, the controller sending a signal to the flow control device to adjust the flow of refrigerant when the stator temperature or the rotor temperature is not within the predetermined temperature range.

14. The method of claim 10 further including the step of providing a subcooler in fluid communication with a condenser and the stator, the subcooler providing high pressure subcooled refrigerant liquid to the stator.

* * * * *